Jan. 10, 1928.

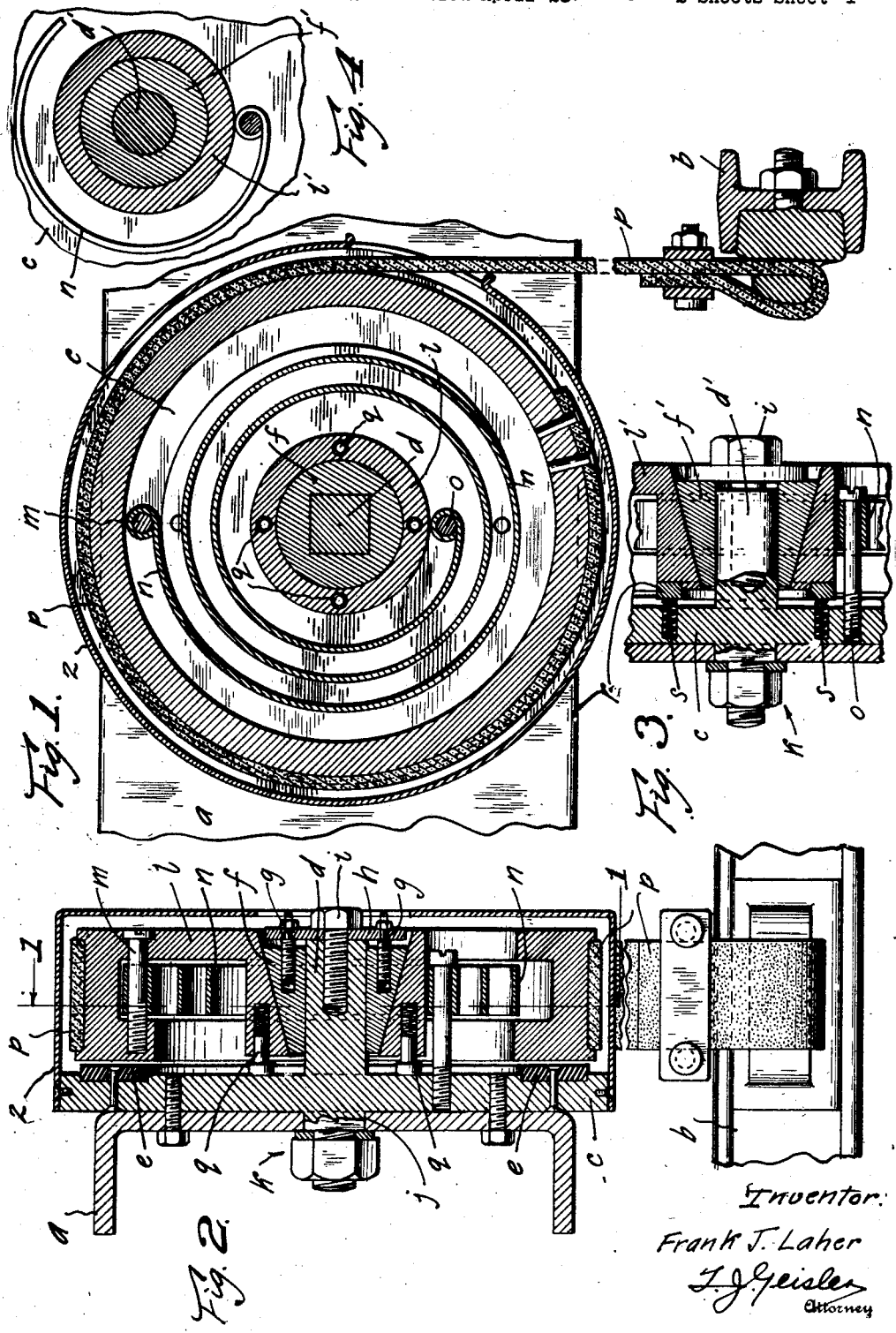

F. J. LAHER 1,655,552

SHOCK ABSORBER

Original Filed April 28, 1926　2 Sheets-Sheet 2

Inventor
Frank J. Laher
By F. J. Geisler
Attorney

Patented Jan. 10, 1928.

1,655,552

UNITED STATES PATENT OFFICE.

FRANK J. LAHER, OF OAKLAND, CALIFORNIA.

SHOCK ABSORBER.

Refiling of application Serial No. 105,266, filed April 28, 1926. This application filed May 31, 1927.
Serial No. 195,508.

As well known, the automobile is relieved of minor jolts while traveling, due to inequalities in the road surfaces, by means of the vehicle springs. But when one of the wheels strikes an abrupt rise or depression in the road surface, and the body of the auto is forced down suddenly its springs are flattened out more or less. In consequence the springs rebound, and throw the body violently upward, sometimes with such force as tends to break the springs, or to cause other injury to the vehicle, or at least discomfort to the passenger. Therefore the necessity for means neutralizing or reducing said sudden jolts is apparent.

But the devices heretofore used, known to applicant, do not neutralize said sudden jolts in an efficient manner. Many of these devices tend to impose the least resistance when the force of the rebound is greatest, as when the leaves of the spring are flattened out by said sudden jolts, and on the other hand tend to impose their greatest resistance at the instant when the reflex force of the spring is diminished.

The object of this invention is to provide a device that will act quickly, just at the moment when the body of the vehicle due to said sudden jolt tends to rise abruptly; at which instant an efficient shock absorber should impose its greatest resistance for a moment so as to arrest the rebound of the vehicle spring, and then should permit the vehicle spring to function as usual.

In other words, my invention has for its principal object the providing of a shock absorber adapted to cushion any of said sudden, violent jolts of the vehicle by restraining in an effective manner the violent rebound of the load-carrying springs, at the same time permitting the lesser oscillations of these springs in the same degree as permitted by the ordinary type of shock absorber.

I attain my object in a shock absorber comprising a bracket or mounting provided with a stationary friction surface, a spring controlled drum provided with a companion friction surface; said friction surfaces arranged for engagement but normally disengaged; a strap is fastened to and winding on said drum the free end of said strap adapted to be fastened to the axle of a vehicle; the bearing of said drum being inclined towards said stationary friction surface; preferably said drum has a conical bearing with the vertex of the cone adjacent said stationary friction surface; whereby a sudden pull on the strap brings the said friction surfaces into engagement and the reflex of the spring controlling the drum will effect their disengagement as the pull on the strap is released.

The most practical means in my opinion by which to cause the lateral movement of the drum on its spindle, consists in providing the spindle with a conical part, and providing the drum with a conical eye corresponding with and slidably mounted on said conical part of the spindle. With such construction, the greater the abrupt pull on the said strap, of the shock absorber, the greater will be the tendency to force the drum into effective engagement with said friction surface, whereby the drum will be firmly held against sudden reverse rotation, and any sudden reflex action or rebound of the vehicle will be effectively restrained; at the same time the shock absorber will not interfere with the normal functions of the spring.

The details of construction preferred by me, and the mode of operation of my invention is described hereinafter with reference to the accompanying drawings.

Fig. 1 shows a fragment of the chassis-frame of an automobile and a fragment of one of its axles, and shows the attachment of my shock absorber as in practice. My device being shown in this figure in section on the line 1—1 of Fig. 2;

Fig. 2 shows similar parts of an automobile as mentioned with respect to Fig. 1, and shows a section of my shock absorber taken approximately on a central vertical line of Fig. 1;

Figure 6:
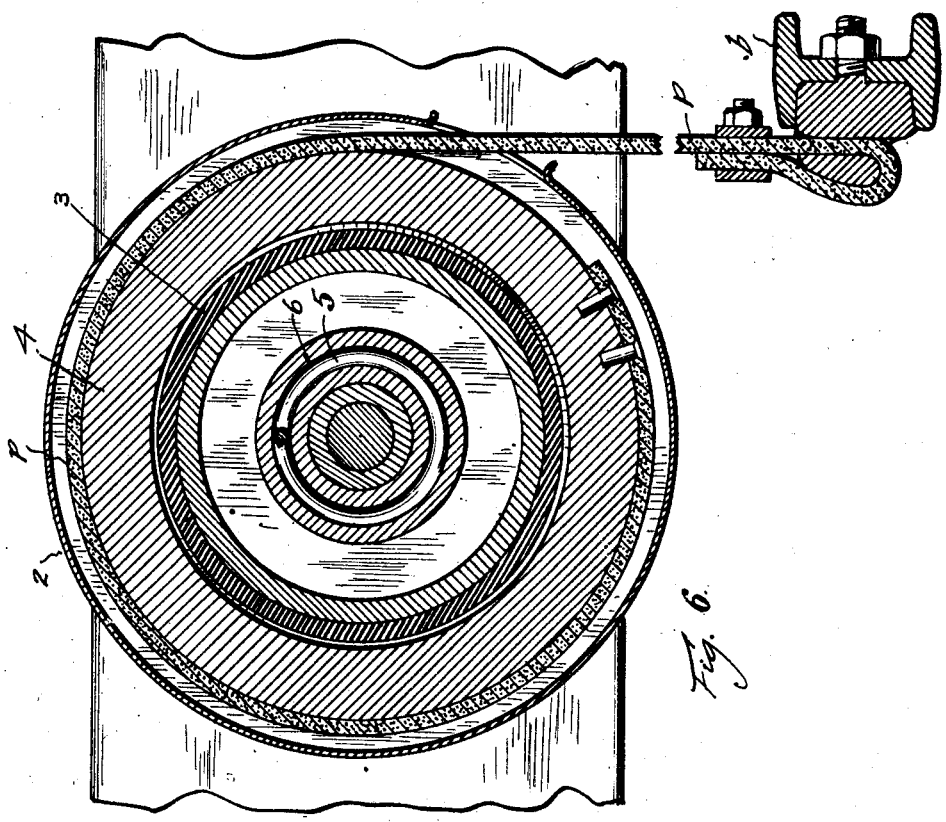
Figure 5:
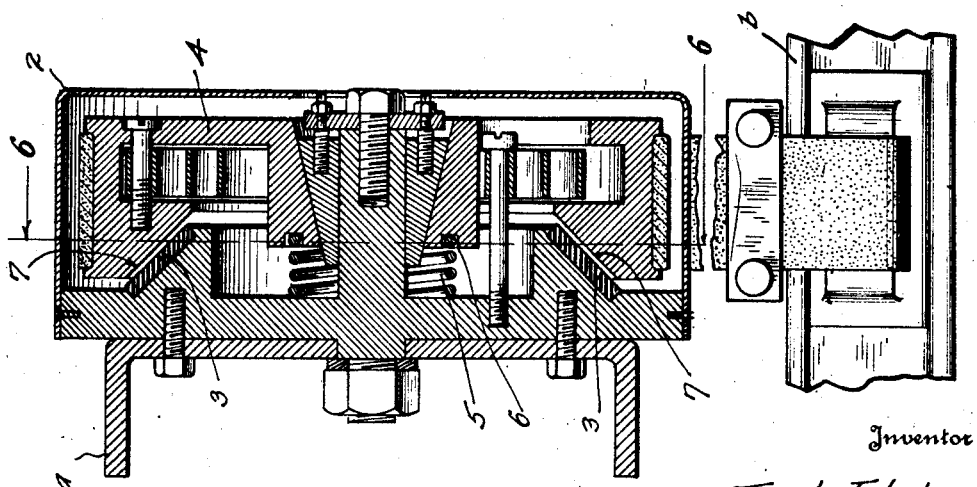

Figs. 3 and 4 show possible modifications of my invention; namely in Figs. 1 and 2, the drum is shown as slidably mounted on a non-rotatable conical piece, while in Figs. 3 and 4 this conical piece is free to rotate;

Fig. 5 shows a section similar to Fig. 2 and illustrates a modification in the application of my invention; as here shown, the opposed co-operating friction surfaces are arranged in the form of a cone instead of flat surfaces as shown in Fig. 2; and Fig. 6 shows a similar modification of my invention as shown by Fig. 5, the section being taken on the line 6—6 of Fig. 5.

Further describing now the details of my invention; *a* represents a section of the chassis-frame of an automobile, and *b* a section of one of the axles. My shock absorber consists of a plate *c* provided with a perpendicular spindle *d* and with an annular brake-lining or friction-surface *e*.

Referring now first to the construction shown in Figs. 1 and 2; The spindle *d* is square in cross-section. On it is slidably mounted a cone *f* axially adjustable by set screws *g*, supported in a plate *h*, firmly secured to the spindle *d* by a stud screw *i*.

The opposite face of the plate *c* is provided by an integral stud-screw *j* on which is mounted a nut and a lock-washer as shown at *k*.

On the cone *f* is mounted a drum *l*, provided with a conical eye corresponding with and slidably mounted on the cone *f*.

In the drum *l* is threaded a bolt *m* to which one end of the spiral spring *n* is fastened, and in the plate *c* is threaded another bolt *o* to which the other end of the spiral spring *n* is fastened.

On the circumference of the drum *l* is fastened, and winds, one end of a strap *p*, the other end of the strap being fastened in any convenient way to the vehicle axle *b*.

The strap *p* is normally maintained in tension by the spiral spring *n* controlling the drum *l*.

In the hub of the drum *l* are slidably inserted pins *q* bearing on the springs, and thus the side of the drum *l* adjacent and opposed to the friction surface *e* is normally spaced from the latter. However no appreciable spacing apart is required; it is merely necessary that said friction surfaces be normally out of engagement. My shock absorber is enclosed by the housing 2.

My device operates as follows:

In case the vehicle is driven over a rough road, and is jolted to such an extent as to force the body down on the axle, the rebound or reflex action of the spring will tend to throw the body forcibly from the axle, with much undesirable "bouncing", as pointed out in the introduction of this specification.

In the jolt bringing the vehicle body and its axle closer together, the strap *p* will be correspondingly wound up on the drum *l*, and the pull on the strap *p* will, when the vehicle body and spring move apart again, tend to rotate the drum reversely. Prior to my improvement such reverse rotation of the drum was resisted only by a spring as *n*, which was found, in practice to be wholly insufficient. By my improvement the sudden pull exerted on the strap *p* by said rebound will pull the drum *l* down on the cone *f*, in so doing bringing its side against the friction surface *e*, thereby arresting the reverse rotation of the drum for the moment, and neutralizing the shock of the said rebound. And when the sudden pull of the strap is diminished, the drum will again be moved from said friction surface by the spring-seated pins *q*, the latter being of sufficient strength to perform that function under the normal tension of the strap *p*. Hence, ordinary vibrations of the vehicle body on the vehicle springs would not cause the incidental pull of the strap *p* to engage said drum with the friction surface *e*. And when engaged with the latter if the pull on the strap *p* is diminished, the drum will be gradually disengaged from the friction surface.

The modifications shown in Figs. 3 and 4 have the following features:

The spindle *d'* is cylindrical and the cone *f'* is free to rotate on the spindle, the drum *l'* is mounted on the cone *f'* as usual and is held from the plate *c* (which is provided with friction surfaces *e* as shown in Fig. 2) by means of springs *s* bearing against a ring *r*, the latter details, however, being variable to suit the preference of the manufacturer.

In other respects the construction shown by Figs. 3 and 4 is similar to that shown in Figs. 1 and 2.

Referring now to Figs. 5 and 6 in this embodiment of my invention, the friction surfaces are arranged in the form of a cone. That is to say the friction surface 3 provided on the face of the plate *c* is so constructed as to bear against the face 7 of the drum 4 in the relation of a cone and conical eye. It may be thought by some users of my invention that the construction thereof last described affords more effective resistance to the drum as it is rotated at the moment of shock. The compression coil spring 5 is arranged to bear against and release the pressure of the drum 4 against the friction surface 3, and is held loosely in place by the circular groove 6 in the drum 4.

I claim:

1. In a shock absorber for vehicle comprising a mounting supporting a spring-controlled rotatable drum, and a strap fastened to and winding on the circumference of said drum, a friction surface provided on said mounting adjacent the drum, a companion friction surface provided on the drum, said friction surfaces being normally spaced apart, means adapted to cause a sudden pull on said strap to bring said friction surfaces into engagement for the moment, and means tending normally to space said friction surfaces from each other.

2. In a shock absorber for vehicle comprising a mounting supporting a spring controlled rotatable drum, and a strap fastened to and winding on the circumference of said drum, a friction surface provided on said mounting adjacent the drum, a companion friction surface provided on the drum, said friction surfaces being normally spaced apart, means adapted to cause a sudden pull on said strap to move said drum into engagement with the first mentioned friction surface for the moment, and means tending normally to move the drum from said friction surface.

3. A shock absorber, comprising a support adapted for being vertically mounted on the chassis-frame of a vehicle, said support including a vertically disposed part provided with a perpendicular spindle and a friction surface, a spring-controlled drum journaled on said spindle and provided with a companion friction surface, said friction surfaces being normally out of engagement, a strap having one end fastened to and wound on the circumference of said drum, and having its other end adapted for being fastened to an axle of the vehicle, and means adapted to cause a downward and oblique movement of the drum on its spindle in response to a sudden pull on said strap, thereby to bring said friction surfaces into engagement.

4. A shock absorber, comprising a support adapted for being vertically mounted on the chassis-frame of a vehicle said support including a vertically disposed part provided with a perpendicular spindle and a friction surface, a spring-controlled drum journaled on said spindle and provided with a companion friction surface, a strap having one end fastened to and wound on the circumference of said drum, and having its other end adapted for being fastened to an axle of the vehicle means adapted to cause a movement of the drum on its spindle in response to a sudden pull on said strap, thereby to bring said friction surfaces into engagement, and means tending normally to space said drum from the friction surface of said plate.

5. A shock absorber, comprising a support adapted for being vertically mounted on the chassis-frame of a vehicle, said support including a vertically disposed part provided with a perpendicular spindle and a friction surface, a spring-controlled drum journaled on said spindle and provided with a companion friction surface, a strap having one end fastened to and wound on the circumference of said drum, and having its other end adapted for being fastened to an axle of the vehicle means adapted to cause a downward and oblique movement of the drum on its spindle in response to a sudden pull on said strap, thereby to bring said friction surfaces into engagement, and means tending normally to space said drum from the friction surface of said plate.

6. A shock absorber, comprising a support adapted for being vertically mounted on the chassis-frame of a vehicle said support including a vertically disposed part provided with a perpendicular spindle and a friction surface, a spring-controlled drum journaled on said spindle and provided with a companion friction surface, a strap having one end fastened to and wound on the circumference of said drum, and having its other end adapted for being fastened to an axle of the vehicle the spindle provided with a conical peripheral part pointed toward the first mentioned friction surface, the drum provided with a conical eye corresponding with, and slidably mounted on said conical part, and means tending normally to space said drum from the friction surface of said plate.

7. A shock absorber, comprising a support adapted for being vertically mounted on the chassis-frame of a vehicle said support including a vertically disposed part provided with a perpendicular spindle and a friction surface, a spring-controlled drum journaled on said spindle and provided with a companion friction surface, a strap having one end fastened to and wound on the circumference of said drum, and having its other end adapted for being fastened to an axle of the vehicle a cone mounted on said spindle, and pointed towards said first mentioned friction surface; means for adjusting the cone axially on the spindle, the drum being provided with a conical eye corresponding with, and slidably mounted on said cone, and means tending normally to space said drum from the friction surface of said plate.

8. In a shock absorber for a vehicle comprising a mounting supporting a spring-controlled rotatable drum, and a strap fastened to and winding on the circumference of said drum, a friction surface provided on said mounting adjacent the drum, a friction surface provided on the drum, said friction surfaces being normally disengaged and means functioning to bring said friction surfaces into engagement when a sudden pull is exerted on said strap, and to separate said friction surfaces again when said pull is released.

9. In a shock absorber, a stationary friction surface, a spring-controlled drum provided with a companion friction surface, said friction surfaces being arranged for engagement but normally disengaged, a strap fastened to and winding on said drum, said drum having a conical bearing with the vertex of the cone adjacent said stationary friction surface, whereby a pull on the strap causes the friction surfaces to be brought into engagement and the reflex of the spring controlling the drum will effect their disengagement as the pull on the strap is released.

FRANK J. LAHER.